US011032336B2

(12) United States Patent
Jurzak et al.

(10) Patent No.: US 11,032,336 B2
(45) Date of Patent: Jun. 8, 2021

(54) METHODS AND SYSTEMS FOR PROVIDING SUPPLEMENTARY INFORMATION ON A VIRTUAL WHITEBOARD

(71) Applicant: MOTOROLA SOLUTIONS, INC., Chicago, IL (US)

(72) Inventors: Pawel Jurzak, Kracow (PL); Grzegorz Kaplita, Rzeszow (PL); Wojciech Kucharski, Rzeszow (PL)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

(21) Appl. No.: 16/975,654

(22) PCT Filed: Mar. 23, 2018

(86) PCT No.: PCT/PL2018/050013
§ 371 (c)(1),
(2) Date: Aug. 25, 2020

(87) PCT Pub. No.: WO2019/182462
PCT Pub. Date: Sep. 26, 2019

(65) Prior Publication Data
US 2020/0412779 A1    Dec. 31, 2020

(51) Int. Cl.
*H04W 4/90* (2018.01)
*H04L 29/06* (2006.01)

(52) U.S. Cl.
CPC ...... *H04L 65/4015* (2013.01); *H04L 65/1096* (2013.01); *H04L 65/403* (2013.01); *H04W 4/90* (2018.02)

(58) Field of Classification Search
CPC ................................. H04L 29/06; H04W 4/90
USPC ............... 348/14.01–14.16; 379/45
See application file for complete search history.

(56) References Cited

U.S. PATENT DOCUMENTS 6,802,611 B2   10/2004  Chu et al.
7,447,360 B2   11/2008  Li et al.
(Continued)

FOREIGN PATENT DOCUMENTS

JP    6240744 B1 *  11/2017  ............. G08B 17/00
JP    6240744 B1    11/2017
(Continued)

OTHER PUBLICATIONS

International Search Report and Written Opinion for Application No. PCT/PL2018/050013 dated Nov. 8, 2018 (10 pages).
(Continued)

*Primary Examiner* — Melur Ramakrishnaiah
(74) *Attorney, Agent, or Firm* — Michael Best and Friedrich LLP

(57) ABSTRACT

Methods and systems for providing supplementary information on a virtual whiteboard. One system includes an electronic computing device including a display and an electronic processor communicatively coupled to the display. The electronic processor is configured to generate a virtual whiteboard on the display and receive an input via the display. The input illustrates a site of an incident. The electronic processor is further configured to identify the site of the incident. The electronic processor is further configured to generate supplementary information about the site of the incident as a function of context information associated with the incident. The electronic processor is further configured to display, on the virtual whiteboard on the display, the supplementary information.

20 Claims, 3 Drawing Sheets

(56) References Cited

U.S. PATENT DOCUMENTS

| | | |
|---|---|---|
| 7,996,465 B2 | 8/2011 | Cromp et al. |
| 8,121,412 B2 | 2/2012 | Predovic et al. |
| 8,954,330 B2 | 2/2015 | Koenig et al. |
| 9,519,414 B2 | 12/2016 | Farouki |
| 2006/0211404 A1* | 9/2006 | Cromp .................. G06Q 10/10 455/405 |
| 2010/0036697 A1* | 2/2010 | Kelnar ............... G06Q 30/0283 705/7.11 |
| 2012/0229468 A1 | 9/2012 | Lee et al. |
| 2013/0197951 A1 | 8/2013 | Watson et al. |
| 2015/0271218 A1 | 9/2015 | Steingrimsson |
| 2016/0192167 A1* | 6/2016 | Piett ........................ H04W 4/90 455/404.2 |
| 2019/0097909 A1* | 3/2019 | Puri .................... H04L 41/0604 |

FOREIGN PATENT DOCUMENTS

| | | | | |
|---|---|---|---|---|
| WO | 2009136259 A2 | 11/2009 | | |
| WO | WO-2009136259 A2 * | 11/2009 | ............ | H04W 76/50 |
| WO | 2017125248 A1 | 7/2017 | | |

OTHER PUBLICATIONS

Microsoft, "MindFinder: Finding Images by Sketching," <https://www.microsoft.com/en-us/research/project/mindfinder-finding-images-by-sketching/#> web page publicly available as early as Aug. 12, 2009.

Autodraw, "Fast drawing for everyone," <https://www.autodraw.com/> web page publicly available as early as Jan. 11, 2018.

* cited by examiner

METHODS AND SYSTEMS FOR PROVIDING SUPPLEMENTARY INFORMATION ON A VIRTUAL WHITEBOARD

BACKGROUND OF THE INVENTION

Devices with touch sensitive displays such as tablets, laptops, phones (for example, cellular or satellite), interactive whiteboards, and other interactive displays and communication devices are now in common use by users, such as first responders (including firefighters, police officers, and paramedics, among others). These devices provide users and others with instant access to increasingly valuable additional information and resources such as vehicle histories, arrest records, outstanding warrants, health information, real-time traffic or other situational status information, and other information that may aid the user in making a more informed determination of an action to take or determining how to resolve a situation, among other possibilities.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
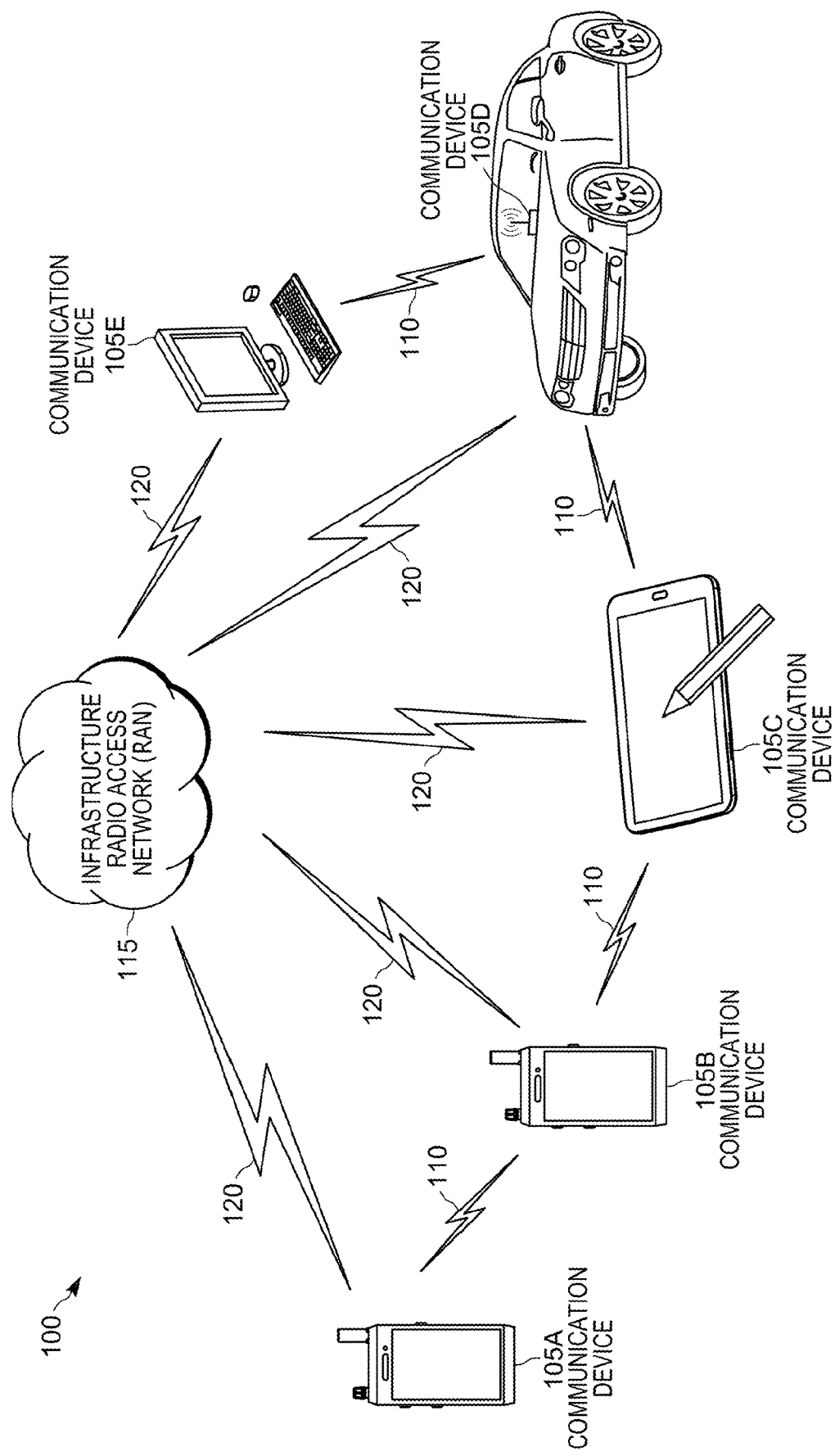
FIG. 1 is a block diagram of a communication system according to one example embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The tablets, laptops, phones (for example, cellular or satellite), two-way radios, and other communication devices mentioned above may provide a virtual whiteboard on a display that allows officers to provide inputs (for example, writings, drawings, and the like) regarding a strategic plan for handling an incident on the virtual whiteboard. In some embodiments, an officer is a person of authority at a particular location or in general (for example, an employee at a hotel such as a manager, a receptionist, a concierge, or a custodian; an employee at a theme park or sporting event such as a security guard, a concession stand worker, or a custodian; a public safety officer such as a police officer, firefighter, or paramedic; and the like). In some embodiments, a public safety officer includes public safety personnel that do not patrol or handle incidents in the field (for example, a dispatcher, a commanding public safety officer managing an incident from a command station, medical personnel at a hospital, and the like). In some embodiments, an incident is an event in which officers are supervising, maintaining, providing assistance, and the like (for example, a concert, a sporting event, management of a theme park or other entertainment venue, and the like). In some embodiments, an incident is a public safety incident in which public safety officers are called to a location to provide assistance in resolving or preventing a societal or environmental problem (for example, a location where a suspect is committing or has committed a crime, a fire, an explosion, a vehicular accident, and the like).

With respect to one example of a virtual whiteboard on a display that allows officers to provide inputs (for example, writings, drawings, and the like) regarding a strategic plan for handling an incident on the virtual whiteboard, a commanding public safety officer provides inputs regarding a strategic plan for handling a public safety incident on the virtual whiteboard. The virtual whiteboard and inputs received by a communication device of the commanding public safety officer may be communicated to remotely located communication devices of public safety officers in the field. For example, the commanding public safety officer may provide a drawing and annotations regarding an incident on a virtual whiteboard on a display of a first communication device located in a public safety command center. The first communication device may transmit data corresponding to the drawing and annotations to one or more second communication devices of public safety officers handling the incident. Accordingly, the public safety officers handling the incident are able to view the virtual whiteboard to take part in a strategic plan devised by the commanding public safety officer to handle the incident.

In some situations, the drawing and annotations of the commanding public safety officer included on the virtual whiteboard may lack specific details of a site of a public safety incident that may be useful to public safety officers when handling the incident. For example, a sketch of a building layout may not be to scale or may omit the locations of interior and/or exterior doors of the building. As another example, a sketch of a city block may omit the locations of fire hydrants and/or the locations of one or more buildings on the city block. On the other hand, when many details of the site of the public safety incident are included on the virtual whiteboard, the display on a communication device that displays the virtual whiteboard may become cluttered which may prevent information from being understood by public safety officers. Thus, there is a technological problem with respect to the interaction between a user and a user interface that displays a virtual whiteboard.

Disclosed are, among other things, a method, device, and system for one or more electronic processors to provide supplementary information on a virtual whiteboard without overcrowding a display of a communication device that displays the virtual whiteboard. In some embodiments, the one or more electronic processors provide supplementary information as a function of context information associated with an incident. In some embodiments, it is advantageous to provide different supplementary information on the displays of communication devices of different officers. For example, the locations of fire hydrants at the site of an incident may be relevant to firefighters but may not be relevant to paramedics at the incident. The disclosed method, device, and system solve the above-noted technical problem by improving the interaction between a user and user interface that displays a virtual whiteboard by making the user interface more efficient and readable to the user. In other words, the disclosed method, device, and system provide officers with relevant supplementary information while preventing cognitive overload that may result when too much information is provided on a display of a communication device.

One embodiment provides an electronic computing device including a display and an electronic processor communicatively coupled to the display. The electronic processor is configured to generate a virtual whiteboard on the display and receive an input via the display. The input illustrates a site of an incident. The electronic processor is further configured to identify the site of the incident. The electronic processor is further configured to generate supplementary information about the site of the incident as a function of context information associated with the incident. The electronic processor is further configured to display, on the virtual whiteboard on the display, the supplementary information.

Another embodiment provides a method of providing supplementary information on a virtual whiteboard. The method includes generating, with an electronic processor of an electronic computing device, the virtual whiteboard on a display. The method further includes receiving an input via the display, the input illustrating a site of an incident. The method further includes identifying, with the electronic processor, the site of the incident. The method further includes generating, with the electronic processor, supplementary information about the site of the incident as a function of context information associated with the incident. The method further includes displaying, on the virtual whiteboard on the display, the supplementary information.

While the examples explained below relate to public safety incidents and public safety officers, in some embodiments, the methods and systems explained below are used by other officers when handling other incidents as mentioned above.

FIG. 1 is a block diagram of a communication system 100 according to one example embodiment. The communication system 100 includes various communication devices 105A through 105E. In the following description, when explaining how a single communication device functions, a reference to communication device 105 is used. As indicated by FIG. 1, the communication device 105 may be any one of a number of different types of communication devices. For example, communication devices 105A and 105B are portable communication devices carried by a public safety officer during patrol. In some embodiments, communication devices 105A and 105B are smart phones or similar devices. As another example, communication device 105C is a tablet that receives input from a user via a touch screen display from a finger of the user or a stylus held by the user. As another example, communication device 105D is a vehicular mobile communication device (for example, included in a police vehicle, a fire truck, an ambulance, and the like). As yet another example, communication device 105E is a computer with a keyboard that may be a desktop computer or a laptop computer. In some embodiments, the communication device 105E is located at a public safety command center and is operated by a public safety officer, such as a commander or a dispatcher, to communicate with public safety officers on patrol at locations outside of the command center.

The types of communication devices 105 described above and shown in FIG. 1 are merely examples. In other embodiments, the communication system 100 includes other types of communication devices such as an interactive whiteboard that may be mounted on a wall. In some embodiments, the communication system 100 includes more or fewer communication devices 105 than the number of communication devices 105 shown in FIG. 1. Although only the communication device 105C is described above as including a touch screen, in some embodiments, one or more of the other communication devices 105A, 105B, 105D, and 105E also include a similar touch screen.

In some embodiments, the communication devices 105A through 105E are capable of directly wirelessly communicating with each other via direct-mode wireless link(s) 110. In some embodiments, the communication devices 105A through 105E are capable of wirelessly communicating with each other via an infrastructure radio access network (RAN) 115 over respective wireless links 120 and via corresponding transceiver circuits. The network 115 may be a wired or a wireless communication network. All or parts of the network 115 may be implemented using various existing networks, for example, a cellular network, the Internet, a land mobile radio (LMR) network, a Bluetooth™ network, a wireless local area network (for example, Wi-Fi), a wireless accessory Personal Area Network (PAN), a Machine-to-machine (M2M) autonomous network, and a public switched telephone network. The network 115 may also include future developed networks.

Figure 2:
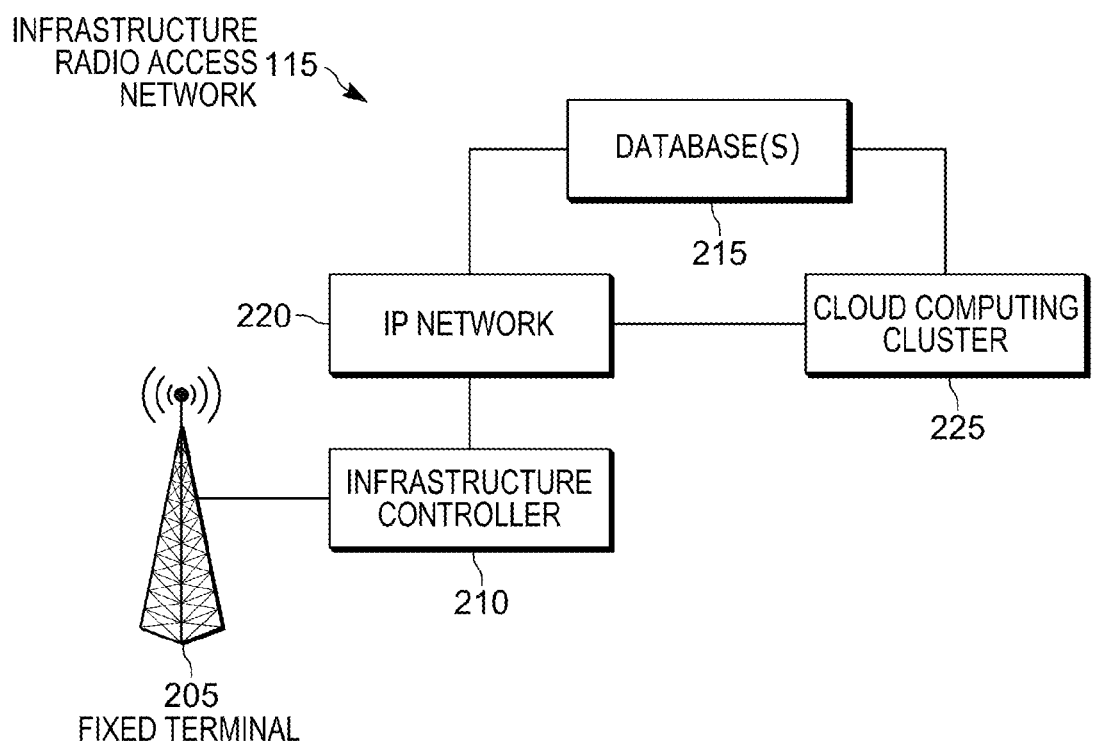
FIG. 2 is a block diagram of an infrastructure radio access network included in the communication system of FIG. 1 according to one example embodiment.

FIG. 2 is a block diagram of the infrastructure radio access network 115 according to one example embodiment. The network 115 includes a fixed terminal 205, for example a base station (for example, an eNodeB), repeater, access point, or the like. The fixed terminal 205 may have one or more transceivers that, for example, serve communication devices 105 in a given region or area, known as a 'cell' or 'site', by radio frequency (RF) communication. The communication devices 105 that are in direct communication with a particular fixed terminal 205 are said to be served by the fixed terminal 205. In one example, all radio communications to and from each communication device 105 within the network 115 are made via respective serving fixed terminals 205. Sites of neighboring fixed terminals 205 may be offset from one another and may provide corresponding non-overlapping or partially or fully overlapping radio frequency coverage areas.

As shown in FIG. 2, the network 115 also includes an infrastructure controller 210 (for example, a radio controller, call controller, push-to-talk (PTT) server, zone controller, mobile management entity (MME), base station controller (BSC), mobile switching center (MSC), site controller, Push-to-Talk controller, or other network device). In some embodiments, the infrastructure controller 210 controls communication between multiple communication devices 105 and between the communication devices 105 and other entities. For example, the infrastructure controller 210 allows the communication devices 105 to access database(s) 215 via an Internet Protocol (IP) network 220 and/or a cloud computing cluster 225 such that the communication devices 105 may communicate with and retrieve data from the database(s) 215. The IP network 220 may comprise one or more routers, switches, local area networks (LANs), wireless local area networks (WLANs), wide area networks (WANs), access points, or other network infrastructure, including but not limited to, the public Internet. The cloud computing cluster 225 may be comprised of a plurality of computing devices, with similar components as the communication devices 105 as set forth in FIG. 3 below, one or more of which may be executing none, all, or a portion of a method explained below with respect to FIG. 4, sequentially or in parallel, across the one or more computing devices. The one or more computing devices comprising the cloud computing cluster 225 may be geographically co-located or may be separated by inches, yards, or miles, and inter-connected via electronic and/or optical interconnects.

In some embodiments, the database(s) 215 include a long-term video storage database, a historical or forecasted weather database, an offender database perhaps including facial recognition images to match against, a cartographic database of streets and elevations, a building database that includes building floor plans and/or blueprints, a traffic database of historical or current traffic conditions, or other types of databases. In some embodiments, the databases 215 are maintained by third parties (for example, the National Weather Service or a Department of Transportation, respectively). In some embodiments, the databases 215 are commercial cloud-based storage devices. In some embodiments, the databases 215 are housed on suitable on-premises database servers. The databases 215 described above are merely examples. In some embodiments, the communication system 100 additionally or alternatively includes other databases that store different information. In some embodiments, the databases 215 and/or additional or other databases are integrated with, or internal to, the infrastructure controller 210.

Although FIG. 2 illustrates a single fixed terminal 205 coupled to a single infrastructure controller 210, in some embodiments, additional fixed terminals 205 and additional infrastructure controllers 210 are disposed to support a larger geographic footprint and/or a larger number of communication devices 105. In some embodiments, one or more communication devices 105 (for example, a dispatch console, a communication device 105 located at a public safety command center, and the like) are coupled to the infrastructure controller 210 via a wired connection and may access the databases 215 and communicate with other communication devices 105 as described above through the wired connection.

Figure 3:
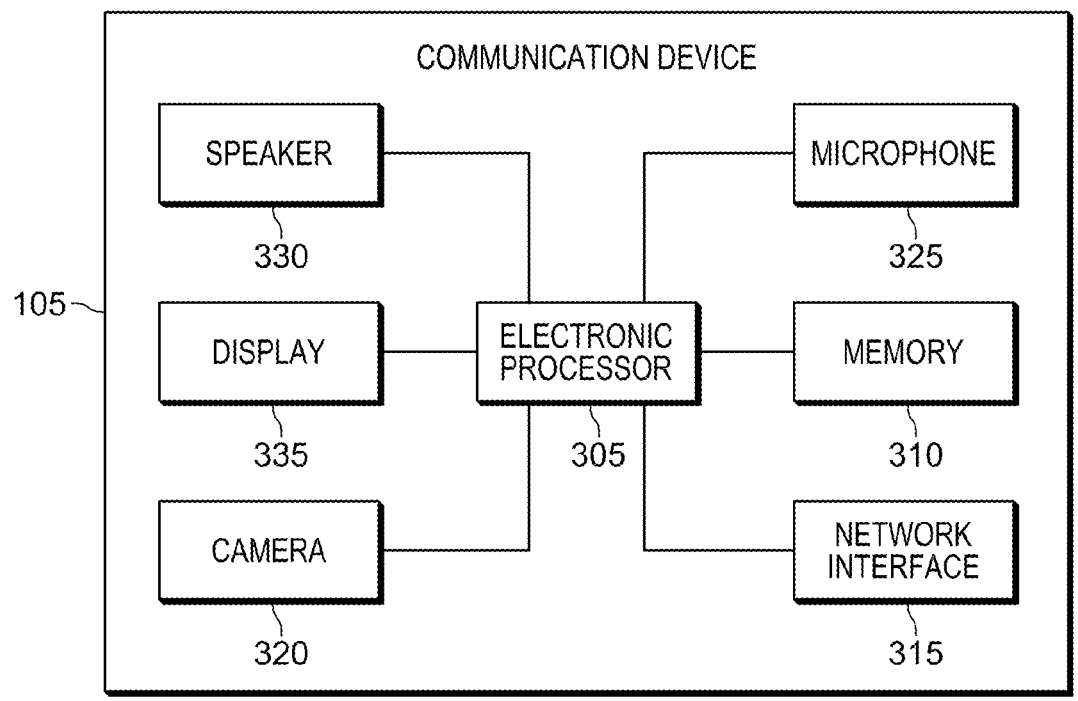
FIG. 3 is a block diagram of a communication device included in the communication system of FIG. 1 according to one example embodiment.

FIG. 3 is a block diagram of a communication device 105 according to one embodiment. In the embodiment illustrated, the communication device 105 includes an electronic processor 305 (for example, a microprocessor or other electronic device). The electronic processor 305 includes input and output interfaces (not shown) and is electrically coupled to a memory 310, a network interface 315, a camera 320, a microphone 325, a speaker 330, and a display 335. In some embodiments, the communication device 105 includes fewer or additional components in configurations different from that illustrated in FIG. 3. For example, the communication device 105 includes a push-to-talk button or a global positioning system (GPS) receiver or a similar component that may determine the geographic coordinates of the location of the communication device 105. In some embodiments, the communication device 105 performs functionality other than the functionality described below.

The memory 310 may include read only memory (ROM), random access memory (RAM), other non-transitory computer-readable media, or a combination thereof. The electronic processor 305 is configured to receive instructions and data from the memory 310 and execute, among other things, the instructions. In particular, the electronic processor 305 executes instructions stored in the memory 310 to perform the methods described herein.

The network interface 315 sends and receives data to and from the network 115. For example, the network interface 315 may include a transceiver for wirelessly communicating with the network 115. Alternatively or in addition, the first network interface 315 may include a connector or port for receiving a wired connection to the network 115, such as an Ethernet cable. The electronic processor 305 may communicate image or video data generated by the camera 320 over the network 115 through the network interface 315, such as for receipt by another communication device 105. In some embodiments, communication of image or video data may occur in approximately real-time. The electronic processor 305 may receive data from the network 115 through the network interface 315, such as from another communication device 105 or the database(s) 215. In some embodiments, the electronic processor 305 receives data through the network interface 315 directly from another communication device 105. The electronic processor 305 receives electrical signals representing sound from the microphone 325 and may communicate information relating to the electrical signals over the network 115 through the network interface 315 to other devices, for example, to another communication device 105. Similarly, the electronic processor 305 may output data received from the network 115 through the network interface 315, for example from another communication device 105, through the speaker 330, the display 335, or a combination thereof.

The display 335 displays images, video, and/or text to the user. The display 335 may be a liquid crystal display (LCD) screen or an organic light emitting display (OLED) display screen. In some embodiments, a touch sensitive input interface may be incorporated into the display 335 as well, allowing the user to interact with content provided on the display 335. In some embodiments, the electronic processor 305 generates a virtual whiteboard on the display 335 such that the user may draw on the virtual whiteboard using a finger or a stylus. In some embodiments, the virtual whiteboard is a graphical user interface (GUI) generated by the electronic processor 305 on the display 335. For example, a virtual whiteboard application is stored in the memory 310, and the electronic processor 305 generates the virtual whiteboard on the display 335 in response to receiving an input to launch the virtual whiteboard application. In some embodiments, the virtual whiteboard includes a blank area on a portion of the display 335 to receive and display inputs from a user. In some embodiments, the virtual whiteboard includes a "Tools" section or other similar section on a portion of the display 335 that provides different options for inputted data to be displayed on the blank area (for example, a button that indicates a thickness of the input, a button that indicates a color of the input, a button that allows for a stored image to be displayed in the blank area). In some embodiments, the display 335 displays an image in the blank area of the virtual whiteboard and receives inputs that allow the user to annotate the image (for example, with arrows, circles, written notes, text boxes, and the like).

Similar to the image or video data generated by the camera 320 that was explained above, the electronic processor 305 may communicate image data generated by the user inputs on the virtual whiteboard received by the display 335 over the network 115, such as for receipt by another communication device 105. For example, the displays 335 on multiple communication devices 105 display the same virtual whiteboard and virtual whiteboard inputs. In other words, virtual whiteboard inputs received on a communication device 105 of a commanding officer are transmitted to be displayed on the displays 335 of communication devices 105 of officers at varying locations handling an incident. In some embodiments, virtual whiteboard inputs on multiple communication devices 105 are shared between specified communication devices 105 (in other words, interactive virtual whiteboarding between all communication devices 105 in an affiliated talkgroup, for example). In other embodiments, virtual whiteboard inputs are only shared with other communication devices 105 when the inputs are received on a predetermined single communication device 105 (for example, the communication device 105 of a commanding officer). In this second situation, communication devices 105 of public safety officers besides the commanding officer may only receive and display the virtual whiteboard information from the communication device 105 of the commanding officer.

In some embodiments, the infrastructure controller 210 and one or more computing devices that comprise the cloud computing cluster 225 include similar components as those shown in FIG. 3 with respect to the communication device 105. For example, the infrastructure controller 210 includes an electronic processor 305, a memory 310, and a network interface 315 as described above but may not include the other components shown in FIG. 3.

As explained above, the communication devices 105 may generate a virtual whiteboard on the respective displays 335 that allows, for example, a commanding public safety officer to provide inputs (for example, writings, drawings, and the like) regarding a strategic plan for handling an incident on the virtual whiteboard. The virtual whiteboard and inputs received by a communication device 105 of the commanding public safety officer may be communicated to remotely located communication devices 105 of public safety officers in the field. Accordingly, the public safety officers handling the incident are able to view the virtual whiteboard to take part in a strategic plan devised by the commanding public safety officer to handle the incident. However, in some situations, the drawing and annotations of the commanding public safety officer included on the virtual whiteboard may lack specific details of a site of a public safety incident that may be useful to public safety officers when handling the incident. On the other hand, when many details of the site of the incident are included on the virtual whiteboard, the display 335 on a communication device 105 displaying the virtual whiteboard may become cluttered which may prevent information from being understood by public safety officers. Thus, there is a technological problem with respect to the interaction between a user and a user interface that displays a virtual whiteboard.

Figure 4:
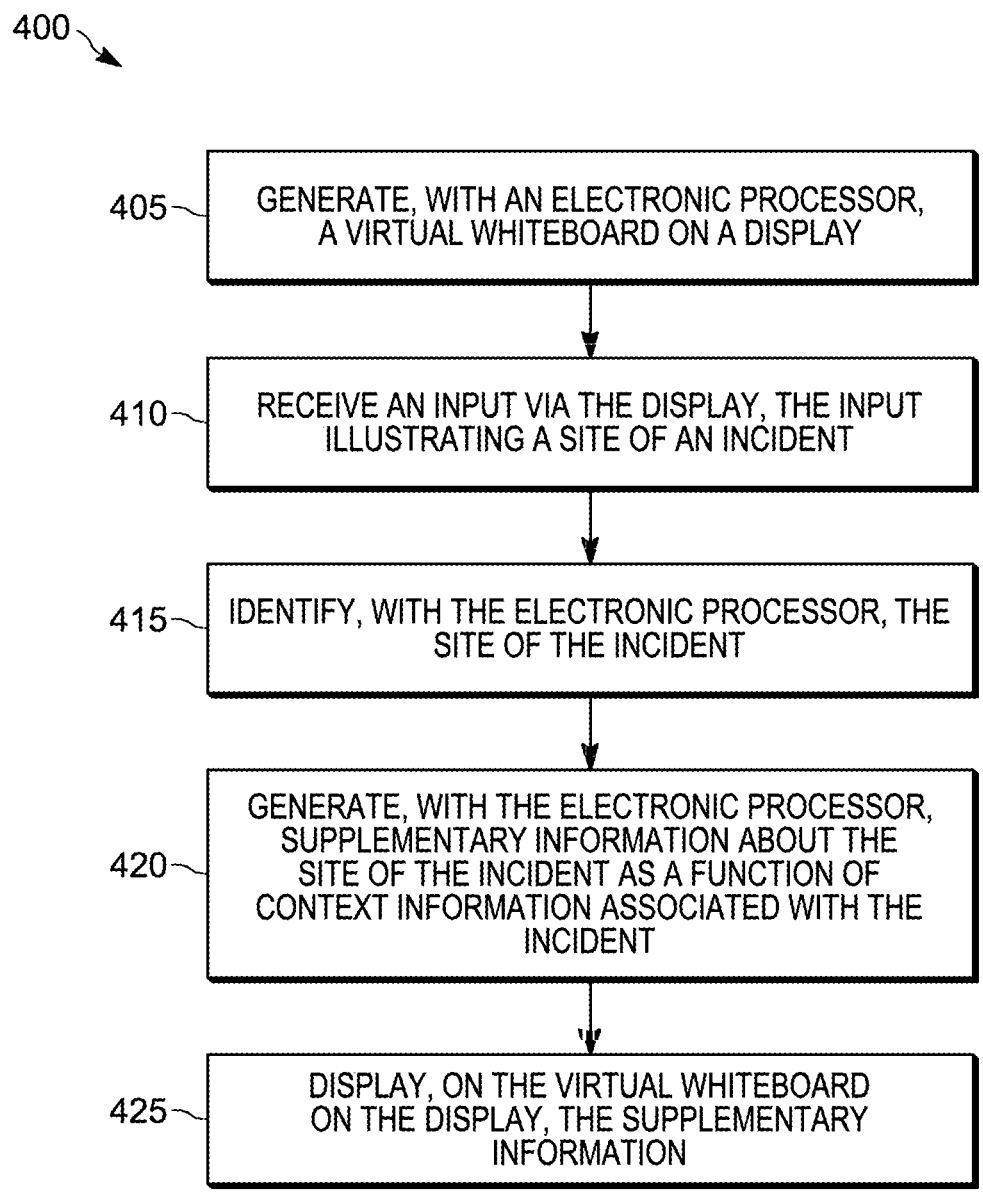
FIG. 4 is a flowchart of a method for providing supplementary information on a virtual whiteboard displayed on a display of the communication device of FIG. 3 according to one example embodiment.

To solve this technological problem, an electronic computing device performs, in one instance, a method 400 illustrated in FIG. 4. The method 400 is executed by the electronic computing device to provide supplementary information on a virtual whiteboard without overcrowding a display 335 of a communication device 105. In other words, the method 400 provides officers with relevant supplementary information while preventing cognitive overload that may result when too much information is provided on the display 335 of a communication device 105.

In some embodiments, the electronic computing device that performs the method 400 includes an individual component and/or a combination of individual components of the communication system 100. In some embodiments, the electronic computing device is a single electronic processor 305 (for example, the electronic processor 305 of one communication device 105). In other embodiments, the electronic computing device includes multiple electronic processors 305 distributed remotely from each other. For example, the electronic computing device is implemented on a combination of at least two of the electronic processor 305 of one communication device 105, the electronic processor 305 of the infrastructure controller 210, and the electronic processor 305 of a back-end device in the cloud computing cluster 225 accessible via the IP network 220.

FIG. 4 illustrates a flow chart diagram of the method 400 performed by the electronic computing device for providing supplementary information on a virtual whiteboard. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure.

At block 405, an electronic processor 305 of the electronic computing device generates a virtual whiteboard on a display 335 of a communication device 105. For example, the communication device 105 is associated with and operated by a commanding public safety officer. At block 410, the communication device 105 receives an input via the display 335. The input illustrates a site of an incident (for example, a city block where a building is on fire, a building where a fugitive is known to be hiding, and the like).

At block 415, the electronic processor 305 identifies the site of the incident. In some embodiments, the electronic processor 305 identifies the site of the incident based on at least one of a group consisting of text recognition of the input received on the virtual whiteboard via the display 335, object recognition of the input received on the virtual whiteboard via the display 335, natural language processing of communications on a communication channel associated with the incident, and a location of a communication device 105 that includes the display 335 on which the input was received (in other words, a location of the communication device 105 of the commanding officer).

For example, the input received on the virtual whiteboard via the display 335 (at block 410) includes writing or text that includes a street name or other name of a location that is recognized by the electronic processor 305. In this example, the electronic processor 305 may determine the content of the writing or text and use the determined content to reference the database 215 to determine the site of the incident.

As another example, the input received on the virtual whiteboard via the display 335 (at block 410) includes a drawing with one or more objects that is recognized by the electronic processor 305. In this example, the electronic processor 305 may use image analytics to recognize a particular arrangement of streets that have been drawn on the display 335 or a particular building layout that has been drawn on the display 335. Similar to the previous example, the electronic processor 305 may reference the database 215 to determine the site of the incident.

As another example, the electronic processor 305 determines the site of the incident by analyzing communications that are occurring on a communication channel associated with the incident. For example, the electronic processor 305 uses a natural language processing engine to analyze oral communications transmitted from and/or received by the communication device 105 on which the input was received on the virtual whiteboard via the display 335 (at block 410). In this example, the electronic processor 305 may determine that a public safety officer communicating over the communication channel stated that there is a fire at 123 Main Street.

Accordingly, using natural language processing of this communication, the electronic processor 305 determines that the site of the incident is 123 Main Street.

As yet another example, the electronic processor 305 determines the site of the incident by determining the location of a communication device 105 that includes the display 335 on which the input was received (at block 410). For example, when the commanding public safety officer is in the field managing the handling of the public safety incident from the site of the public safety incident, the electronic processor 305 determines that a drawing received via the display 335 corresponds to a current location of the communication device 105 of the commanding public safety officer (for example, as determined from a global positioning system of the communication device 105). Similar to previous examples, the electronic processor 305 may reference the database 215 to determine characteristics of the current location of the communication device 105 to determine whether such characteristics correspond to the input received on the virtual whiteboard via the display 335.

In some embodiments, the electronic processor 305 may use two or more of the methods described in the examples above in combination to determine the site of the incident. For example, the electronic processor 305 may use both text recognition and object recognition of the input received on the virtual whiteboard via the display 335 to identify the site of the incident.

At block 420, the electronic processor 305 generates supplementary information about the site of the incident as a function of context information associated with the incident. In some embodiments, such supplementary information includes information about the site itself and/or information about an area surrounding the site (for example, an area within one hundred yards, one mile, ten miles, and the like of the site of the incident). In some embodiments, the context information associated with the incident includes at least one of a type of incident (for example, fire, robbery, pursuit of a fugitive, traffic accident, and the like), a role of an officer associated with the incident (for example, a firefighter, a paramedic, a police officer, and the like), a skill of an officer associated with the incident (for example, a sharp shooter, expertise with explosives, and the like), and a task to be performed by an officer associated with the incident. As indicated by some of the above examples, in some embodiments, the context information associated with the incident is context information of an officer associated with the incident (for example, role information, skill information, task information, and the like).

In some embodiments, at least some of the context information (for example, the role of the officer and the skill of the officer, and the like) is stored on the memory 310 of one or more communication devices 105 and/or is retrieved by the electronic processor 305 from, for example, the database(s) 215. In some embodiments, at least some of the context information (for example, the type of incident, the task to be performed by an officer, and the like) is determined by the electronic processor 305 in a similar manner as explained above with respect to identifying the site of the incident (at block 415). For example, the electronic processor 305 determines context information based on at least one of text recognition of the input received on the virtual whiteboard via the display 335, object recognition of the input received on the virtual whiteboard via the display 335, natural language processing of communications on a communication channel associated with the incident, and a location of a communication device 105 of the commanding officer. In some embodiments, at least some of the context information (for example, the type of incident) is determined by the electronic processor 305 as a function of a talkgroup with which the communication device 105 of the commanding officer is configured to communicate.

As one example of determining context information, the electronic processor 305 determines that the type of incident is a public safety incident that is a fire. In some embodiments, the electronic processor 305 makes such a determination by analyzing communications on a communication channel associated with the public safety incident using a natural language processing engine. For example, the electronic processor 305 recognizes that the word "fire" and other related words have been used multiple times during communications. In some embodiments, the electronic processor 305 determines that the type of public safety incident is a fire based on a talkgroup with which the communication device 105 of the commanding officer is configured to communicate. In other words, when the communication device 105 of the commanding public safety officer is configured to communicate over a talkgroup channel associated with firefighters handling an incident, the electronic processor 305 determines that the type of incident is a fire. In some embodiments, the electronic processor 305 determines that the type of public safety incident is a fire based on the communication device 105 on which the input is received via the display 335 being associated with a fire chief as the commanding officer. In other words, because the role of public safety officer associated with the communication device 105 is a fire chief, the electronic processor 305 determines that the public safety incident is a fire.

As another example of determining context information, the electronic processor 305 determines that a task of a public safety officer at the site of the incident is to monitor the back of a building to determine whether a fugitive exits the building. In some embodiments, the electronic processor 305 is configured to determine the task to be performed by the public safety officer as a function of at least one of a group consisting of object recognition of the input received on the virtual whiteboard and natural language processing of communication on a communication channel associated with the incident. For example, the electronic processor 305 recognizes that the commanding public safety officer verbally requested on the communication channel that Officer Smith monitor the building to determine whether the fugitive exits. Continuing this example, the electronic processor 305 determines that the verbal request of the commanding public safety officer was substantially contemporaneous (for example, within five seconds, ten seconds, or the like) with an input being received on the virtual whiteboard via the display 335 that corresponds to an arrow pointing to the back of the building.

Once the electronic processor 305 has determined at least some context information associated with the incident, the electronic processor 305 generates supplementary information about the site of the incident as a function of the context information associated with the incident. Continuing the first example explained above relating to the fire, the electronic processor 305 may determine locations of nearby fire hydrants, gas pipelines, and other items that may be relevant to public safety officers handling the fire as a function of the incident being determined to be a fire (as determined in any one of a number example ways described above). Continuing the second example explained above relating to the monitoring of a building, the electronic processor 305 may determine locations of exits on the back of the building (for example, doors and windows) through which the fugitive may try to exit. In other words, the electronic processor 305 determines supplementary information as a function of a task to be performed by an officer. As an additional example of supplementary information, the electronic processor 305 corrects the scale of objects or the distance between objects drawn on the virtual whiteboard. In some embodiments, the electronic processor 305 displays a map of the area drawn on the virtual whiteboard in place of a sketched map on the virtual whiteboard. In such embodiments, the electronic processor 305 may continue to display other inputs received on the virtual whiteboard via the display 335 (for example, arrows, notes, text, and the like) such that annotations made on the sketched map remain viewable on the map generated by the electronic processor 305.

In some embodiments, the electronic processor 305 determines the supplementary information about the site of the incident by retrieving information from the database(s) 215. For example, the electronic processor 305 retrieves a map of the site of the incident from the database(s) 215 in response to identifying the site of the incident. In some embodiments, the electronic processor 305 generates the supplementary information based on the map. As used in the specification, the term "map" includes different types of maps including, but not limited to, physical maps, political maps, road maps, and topographic maps. Additionally, the term "map" includes maps that illustrate details of buildings such as locations of buildings in an area, blueprints of the internal design of buildings, and floor plans or layouts of the interior of buildings. As mentioned above, the electronic processor 305 may access at least some of these maps through third party databases.

In some embodiments, the electronic processor 305 may perform image analysis of retrieved maps to determine relevant supplementary information (for example, to determine the location of fire hydrants on a city block or to determine exits in the floor plan of a building). In other embodiments, potentially relevant supplementary information associated with a map is stored in the database(s) 215. For example, such information may be manually identified by public safety officers and stored for future use. As another example, the electronic processor 305 stores supplementary information determined during a first incident in the database(s) 215 for possible future use during a second incident that occurs at approximately the same location.

At block 425, the electronic processor 305 displays the supplementary information on the virtual whiteboard on the display 335 of the communication device 105. Continuing the example explained above relating to the fire, the electronic processor 305 may display the determined locations of nearby fire hydrants, gas pipelines, and other items that may be relevant to public safety officers handling the fire. Continuing the example explained above relating to the monitoring of a building, the electronic processor 305 displays locations of exits on the back of the building through which the fugitive may try to exit. By providing such supplemental information on the virtual whiteboard on the display 335 as a function of context information associated with the incident, the electronic processor 305 provides additional relevant information to the public safety officer without overcrowding the display 335.

As mentioned above, in some embodiments, the virtual whiteboard and virtual whiteboard inputs received via the display 335 of the communication device 105 of a commanding officer (in other words, a first display 335 of a first communication device 105) are displayed on the displays 335 of other communication devices 105 of officers at varying locations handling an incident. In other words, in some embodiments, the electronic processor 305 transmits, via the network interface 315, the input and supplementary information to a second communication device 105 that includes a second display 335 configured to display the virtual whiteboard including the input received via the first display 335 and the supplementary information generated by the electronic processor 305.

In some embodiments, the electronic processor 305 generates personalized supplementary information for different officers whose communication devices 105 display the virtual whiteboard on the respective displays 335. In other words, the electronic processor 305 generates first supplementary information as a function of context information of a first officer and generates second supplementary information as a function of context information of a second officer. The electronic processor 305 may display the first supplementary information on a virtual whiteboard on a display 335 of a first communication device 105 associated with the first officer. The electronic processor 305 may display the second supplementary information on the virtual whiteboard on a display 335 of a second communication device 105 associated with the second officer. In some embodiments, at least some of the second supplementary information is different than the first supplementary information.

In some embodiments, the electronic processor 305 generates different supplemental information for different officers as a function of role information, skill information, task information, and the like in a similar manner as described above with respect to context information associated with the incident. For example, the electronic processor 305 generates different supplemental public safety information for firefighters handling the public safety incident than for paramedics handling the public safety incident. Returning to the example described above relating to the fire, the electronic processor 305 generates and displays the determined locations of nearby fire hydrants, gas pipelines, and other items that may be relevant to firefighters on the respective displays 335 of communication devices 105 of users whose role indicates that they are firefighters. However, such information may not be relevant to paramedics whose primary task is to transport wounded victims to a hospital. Accordingly, the electronic processor 305 may not display the fire hydrants and gas pipelines on the virtual whiteboard of the respective displays 335 of the communication devices 105 of the paramedics. Rather, the electronic processor 305 may generate and display a location of a nearby hospital and traffic information relating to routing options between the site of the public safety incident and the hospital.

As another example, the electronic processor 305 may provide indications of a high vantage point at the site of the public safety incident in response to determining that a public safety officer is a sharp shooter (in other words, as a function of a skill of a public safety officer). The electronic processor 305 may provide such an indication on the virtual whiteboard on the display 335 of the public safety officer characterized as a sharp shooter but may not provide such an indication on the virtual whiteboard on the displays 335 of other public safety officers that are not characterized as sharp shooters. As described above, the role information and skill information of public safety officers may be stored on the memory 310 of one or more communication devices 105 and/or may be retrieved by the electronic processor 305 from, for example, the database(s) 215.

By providing first supplemental information to a first officer that is different than second supplemental information provided to a second officer, the electronic processor 305 may improve the interaction between a user and user interface that displays a virtual whiteboard by making the user interface more efficient and readable to the user. The personalized information may reduce a cognitive load of at least some officers by reducing the amount of irrelevant information that they receive. Along similar lines, the personalized information may reduce mental and physical stress and fatigue that some officers may experience when supplemental information added to a virtual whiteboard on the display 335 is not personalized.

Although the above explanation of personalized supplemental information refers to first and second supplemental information generated as a function of the context of a respective first and second officer, in some embodiments, the electronic processor 305 generates additional personalized supplemental information as a function of the context of respective additional officers.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic computing device comprising:
a display; and
an electronic processor communicatively coupled to the display, the electronic processor configured to
generate a virtual whiteboard on the display,
receive an input via the display, the input illustrating a site of an incident,
identify the site of the incident,
generate supplementary information about the site of the incident as a function of context information associated with the incident, and
display, on the virtual whiteboard on the display, the supplementary information;
wherein the display is included on a first communication device of a first officer, and the supplementary information is first supplementary information generated as a function of context information of the first officer; and
wherein the electronic computing device is further configured to
generate second supplementary information about the site of the incident as a function of context information of a second officer associated with the incident and associated with a second communication device, wherein at least some of the second supplementary information is different than the first supplementary information, and display, on the virtual whiteboard on a second display of the second communication device, the second supplementary information.

2. The electronic computing device of claim 1, wherein the display is included on a first communication device, and
wherein the electronic processor is further configured to transmit, via a network interface, the input and the first supplementary information to the second communication device, the second communication device including the second display configured to display the virtual whiteboard including the input and the first supplementary information.

3. The electronic computing device of claim 1, wherein the electronic processor is configured to identify the site of the incident based on at least one of a group consisting of text recognition of the input, object recognition of the input, natural language processing of communications on a communication channel associated with the incident, and a location of the first communication device that includes the first display on which the input was received.

4. The electronic computing device of claim 1, wherein the electronic processor is configured to:
retrieve a map from a database in response to identifying the site of the incident; and
generate at least one of the first supplementary information and the second supplementary information based on the map.

5. The electronic computing device of claim 1, wherein at least one of the context information of the first officer and the context information of the second officer is context information of an officer and includes at least one of a group consisting of a role of the respective officer and a skill of the respective officer.

6. The electronic computing device of claim 1, wherein the electronic processor is configured to generate at least one of the first supplementary information and the second supplementary information as a function of a task to be performed by an the respective officer.

7. The electronic computing device of claim 6, wherein the electronic processor is configured to determine the task to be performed by the respective officer as a function of at least one of a group consisting of object recognition of the input and natural language processing of communication on a communication channel associated with the incident.

8. The electronic computing device of claim 1, wherein the display is included on a communication device, and wherein the electronic processor is configured to generate at least one of the first supplementary information and the second supplementary information as a function of a talkgroup with which the respective communication device is configured to communicate.

9. The electronic computing device of claim 1, wherein the incident is a public safety incident.

10. The electronic computing device of claim 1,
wherein the virtual whiteboard includes a visual representation of the site of the incident;
wherein the first supplementary information includes at least one first location at the site of the incident, and the second supplementary information includes at least one second location at the site of the incident that is different than the at least one first location;
wherein the virtual whiteboard displayed on the first communication device includes the first supplementary information indicating the at least one first location on the visual representation of the site of the incident; and
wherein the virtual whiteboard displayed on the second communication device (i) includes the second supplementary information indicating the at least one second location on the visual representation of the site of the incident and (ii) does not include the first supplementary information on the visual representation of the site of the incident.

11. A method of providing supplementary information on a virtual whiteboard, the method comprising:
generating, with an electronic processor of an electronic computing device, the virtual whiteboard on a display;
receiving an input via the display, the input illustrating a site of an incident;
identifying, with the electronic processor, the site of the incident;
generating, with the electronic processor, supplementary information about the site of the incident as a function of context information associated with the incident; and
displaying, on the virtual whiteboard on the display, the supplementary information, wherein displaying the supplementary information includes displaying the supplementary information on the display of a first communication device of a first officer, the supplementary information being first supplementary information generated as a function of context information of the first officer;
generating, with the electronic computing device, second supplementary information about the site of the incident as a function of context information of a second officer associated with the incident and associated with a second communication device, at least some of the second supplementary information being different than the first supplementary information; and
displaying, on the virtual whiteboard on a second display of the second communication device, the second supplementary information.

12. The method of claim 11, further comprising:
transmitting, via a network interface of the first communication device, the input and the first supplementary information to the second communication device, the second communication device including the second display configured to display the virtual whiteboard including the input and the first supplementary information.

13. The method of claim 11, wherein identifying the site of the incident includes identifying the site of the incident based on at least one of a group consisting of text recognition of the input, object recognition of the input, natural language processing of communications on a communication channel associated with the incident, and a location of the first communication device that includes the first display on which the input was received.

14. The method of claim 11, further comprising:
retrieving, with the electronic processor, a map from a database in response to identifying the site of the incident; and
generating, with the electronic processor, at least one of the first supplementary information and the second supplementary information based on the map.

15. The method of claim 11, wherein at least one of the context information of the first officer and the context information of the second officer includes at least one of a group consisting of a role of the respective officer and a skill of the respective officer.

16. The method of claim 11, wherein generating at least one of the first supplementary information and the second supplementary information includes generating at least one of the first supplementary information and the second supplementary information as a function of a task to be performed by the respective officer.

17. The method of claim 16, further comprising determining, with the electronic processor, the task to be performed by the respective officer as a function of at least one of a group consisting of object recognition of the input and natural language processing of communication on a communication channel associated with the incident.

18. The method of claim 11, wherein
generating at least one of the first supplementary information and the second supplementary information includes generating at least one of the first supplementary information and the second supplementary information as a function of a talkgroup with which the respective communication device is configured to communicate.

19. The method of claim 11, wherein identifying the site of the incident includes identifying the site of the incident, the incident being a public safety incident.

20. The method of claim 11,
wherein the virtual whiteboard includes a visual representation of the site of the incident;

wherein the first supplementary information includes at least one first location at the site of the incident, and the second supplementary information includes at least one second location at the site of the incident that is different than the at least one first location;

wherein the virtual whiteboard displayed on the first communication device includes the first supplementary information indicating the at least one first location on the visual representation of the site of the incident; and wherein the virtual whiteboard displayed on the second communication device (i) includes the second supplementary information indicating the at least one second location on the visual representation of the site of the incident and (ii) does not include the first supplementary information on the visual representation of the site of the incident.

* * * * *